United States Patent Office 3,347,924
Patented Oct. 17, 1967

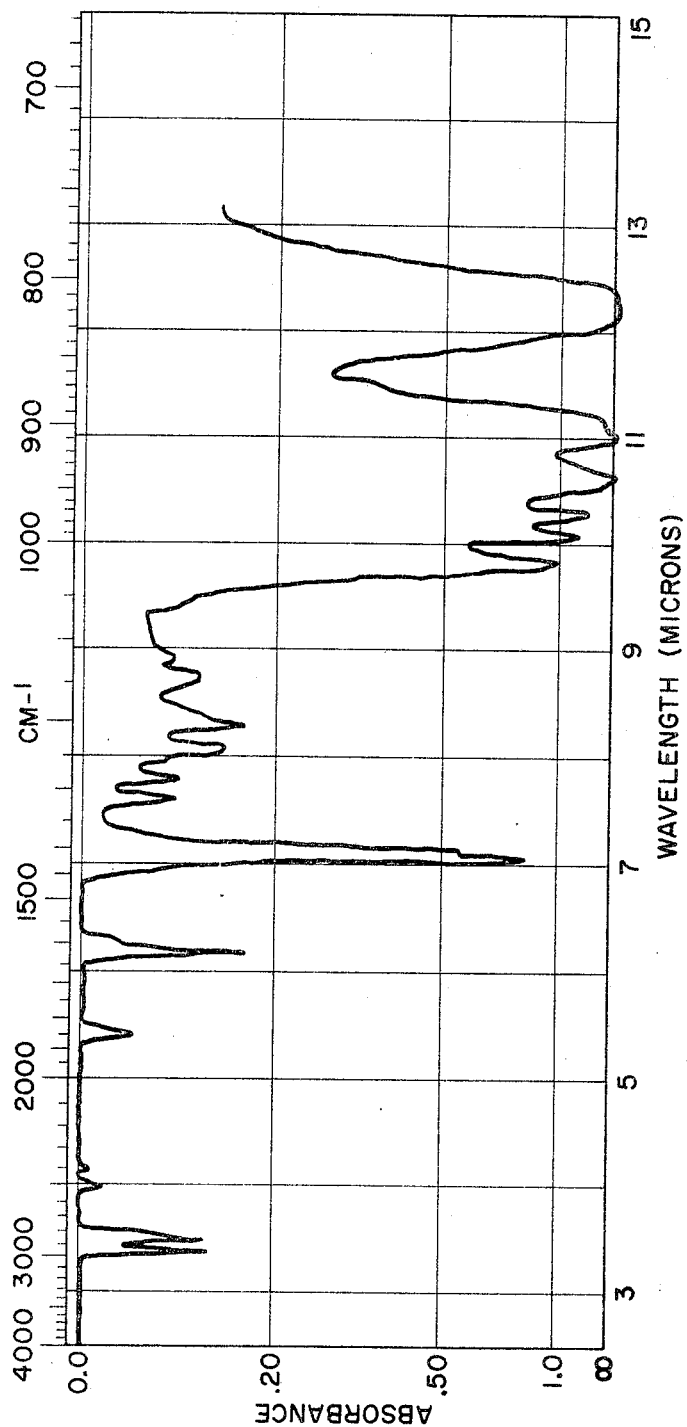
Fig. I
Anthony J. Passannante
Richard P. Rhodes
Leland K. Beach
Inventors
By R. S. Marebeau Patent Attorney

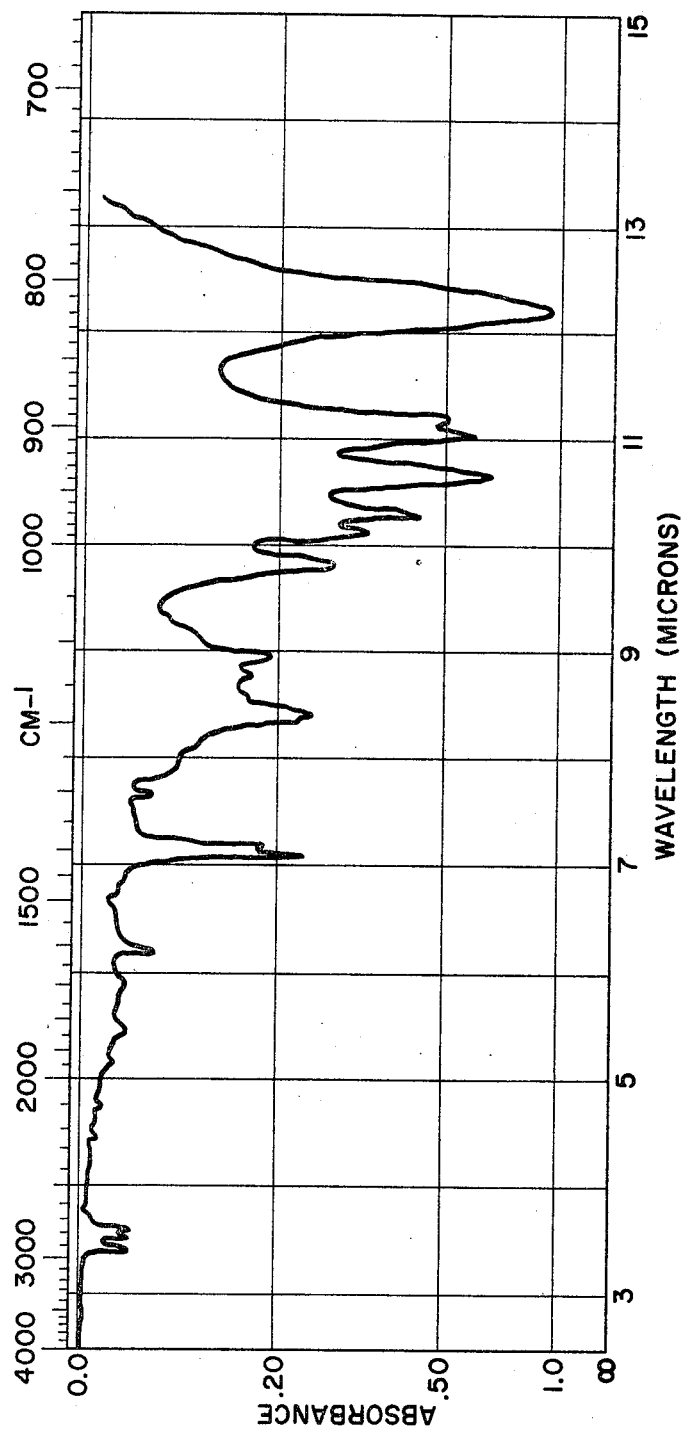
Fig. II
Anthony J. Passannante
Richard P. Rhodes
Leland K. Beach
Inventors

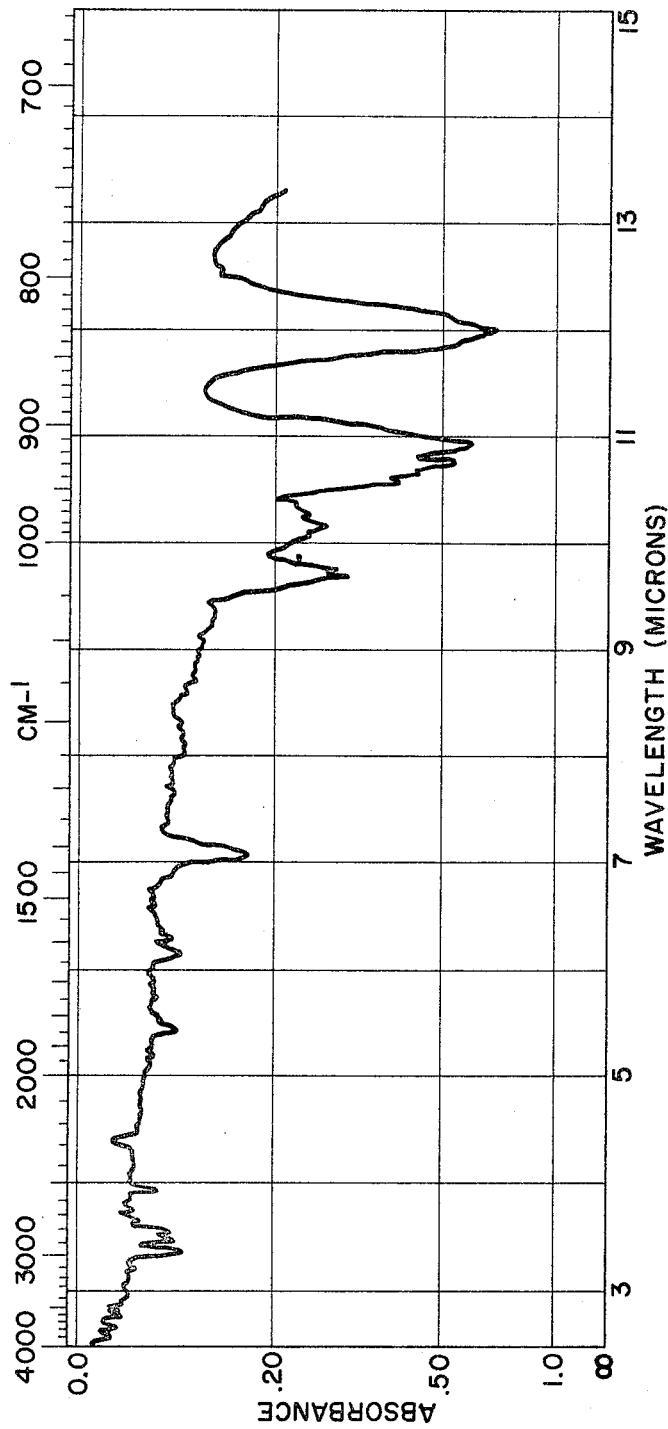
Fig. III
Anthony J. Passannante
Richard P. Rhodes
Leland K. Beach
Inventors

3,347,924
ALLYL DIFLUOROAMINE
Anthony J. Passannante, Metuchen, Richard P. Rhodes, Newark, and Leland K. Beach, Westfield, N.J., assignors to Esso Research and Engineering Company, a corporation of Delaware
Filed Dec. 1, 1959, Ser. No. 856,616
1 Claim. (Cl. 260—583)

The present invention relates to fluoroamino compounds. Specifically the invention concerns a new compound, namely allyl difluoroamine.

Strong oxidizers are quite valuable in the chemical field, especially for chemical fuels. Considerable work has been done to make better oxidizing agents for fuels. Calculations indicate that compounds having a relatively high $NF_2/C$ ratio will have good oxidizing properties. A number of attempts have been made to prepare various compounds of this type since they are useful in rocket propellant systems.

It has been discovered that a highly useful organic fluoroamine can be made by reacting an allyl halide compound with tetrafluorohydrazine either in the vapor or liquid phase. This reaction surprisingly results in the formation of allyl difluoroamine. The preparation of allyl difluoroamine is unexpected because usually $NF_2$ groups add to the double bond and do not substitute.

FIGURE I shows the infrared spectrum of pure liquid allyl difluoroamine.

FIGURE II shows the infrared spectrum of a carbon tetrachloride solution of allyl difluoroamine.

FIGURE III shows the infrared spectrum of allyl difluoroamine vapor.

The allyl difluoroamine is easily made by reacting allyl bromide ($CH_2=CH-CH_2Br$) with tetrafluorohydrazine in the vapor phase. The tetrafluorohydrazine, which is a gas at ambient temperatures and atmospheric pressure, should be essentially free of substances which interfere with the reaction. It has been found that tetrafluorohydrazine having a purity of at least 99% is satisfactory for the purposes of the present invention, although lower purities can be used if interfering impurities are absent. When the reaction is carried out in the vapor phase, the tetrafluorohydrazine may be either preheated to reaction temperature or introduced into a reaction zone which is maintained at the desired temperature. In liquid phase reactions it may be bubbled through the liquid in the reaction zone which may consist of the other reactant alone or in admixture with an inert diluent. While liquid tetrafluorohydrazine can be used in these reactions, it is preferred not to do so because it is necessary to employ high pressures and under such conditions the reaction is quite hazardous.

The reaction temperature is not critical and practically any temperature within the conventional reaction range may be employed, e.g. —100 to 300° C. The most suitable temperature range from an economic point of view is between 15 and 250° C., the higher temperatures, i.e. 150 to 250° C. being especially preferred because the reaction proceeds quite rapidly at these temperatures. The pressure may be atmospheric or superatmospheric pressures, e.g. up to 50 atmospheres, may be used where necessary. Even subatmospheric pressures, for example as low as 10 mm. of mercury absolute pressure, may be employed. The recommended pressure is the sum of the vapor pressures of the components in the reaction zone at the selected reaction temperature.

In one embodiment, the two reactants are independently preheated to the reaction temperature and then separately introduced into the reaction zone, which is maintained at the aforementioned temperature. The reactants are maintained in contact with each other in the reaction zone for several seconds, e.g. 3 or 4 seconds, to 1 or 2 hours. The reaction time at the optimum temperature is about 0.1 to 30 minutes. Sufficient tetrafluorohydrazine should be used in the reaction to permit the introduction of the $NF_2$ group into the reactant. That is to say, that the halogen, which is on the allyl carbon, is substituted with an $NF_2$ group. The desired reaction can be achieved by reacting stoichiometric amounts of the particular reactants.

The reaction may be carried out either batchwise or continuously. Since the reaction mixture may comprise gases, liquids and solids, conventional recovery techniques should be employed to prevent the loss of any of the desired products. For instance, a Dry Ice condenser may be attached to the outlet of the reaction zone to trap any gas products. Solid products may be recovered by filtering and drying, while liquid products may be separated by vacuum fractional distillation. Where the product is made in relatively small amounts, chromatographic separating methods are advantageously employed.

Among the novel compositions of matter prepared by the process described above is allyl difluoroamine which is a liquid that boils at 41° C. under atmospheric pressure. It has the following chemical formula:

$$H_2C=CH-CH_2NF_2$$

It can be polymerized to make a polymer which is suitable as an oxidizer-binder for a solid rocket propellant or it can be used as an oxidizer or fuel in a liquid propellant. For example, it can be mixed with an excess of liquid oxygen and burned in the conventional manner. Allyl difluoroamine is useful as an intermediate in the preparation of nitriles, amines and other high energy nitrogen-containing compounds, such as 1,2,3-tris-(difluoroamino) propane, of known utility. It can also be pyrolyzed to make carbon black.

The following example is given to specifically describe how this new compound can be made and to disclose other physical properties and characteristics of allyl difluoroamine.

EXAMPLE

Allyl bromide is preheated to 230° C. and is continuously introduced into one end of a stainless steel tubular reactor, which is ¼ inch in diameter (outside) and 17 feet long, along with tetrafluorohydrazine which has been preheated to the same temperature. The reactor has a Dry Ice trap at its exit end. The mole raito of allyl bromide to tetrafluorohydrazine is 1.1 to 1 and the contact time in the tubular reactor is about 1 minute. The reaction products are withdrawn from the reactor and the crude product which condenses in a Dry Ice bath is charged to an atmospheric multiplate still fitted with a Dry Ice reflux head. The charge is distilled and the pure allyl difluoroamine is recovered overhead at a temperature of 41° C. in a high state of purity. The mole percent yield of each product recovered is shown in Table I.

Table I

| Products: | Mole percent yield based on allyl bromide reacted |
|---|---|
| Allyl difluoroamine | 33 |
| 1,2,3-tris (difluoroamine) propane | 33 |
| 1,2,3-tribromopropane | 22 |
| 1,2-dibromo-3-difluoroaminopropane | ca. 12 |

The brominated products in the reaction mixture indicate that a bromination reaction is occurring in the reaction zone. The initial reaction is thought to be the following:

$$2CH_2=CHCH_2Br+N_2F_4 \rightarrow 2CH_2=CH-CH_2NF_2+Br_2$$

Other reactions, which for the purposes of the present invention may be considered side reactions, take place in the reaction mixture. For instance, some of the allyl difluoroamine may react with bromine to form 1,2-dibromo-3-difluoroamine propane.

The allyl difluoroamine compound $$(CH_2=CH-CH_2NF_2)$$

contains 55.9 wt. percent $NF_2$ and has an $NF_2$ to carbon ratio of 0.33 to 1. It has a density of 1.045 at 23.5° C. and a boiling point of 41° C. The infrared spectra of this substance in liquid, dilute liquid and in vapor phase are shown in the accompanying figures.

The structure of this compound is confirmed by the following nuclear magnetic resonance measurements made at 40 mc. at a sweep rate of 20.0 c.p.s.:

| | |
|---|---|
| Location [1] p.p.m. | 134 |
| Relative intensity | 1 |
| H–F coupling $J_{HF}$ (c.p.s.) | 29.0 |

[1] Measured with reference to trifluoroacetic acid.

The peak found at 134 p.p.m. is assigned to an $NF_2$ group on a primary carbon. No peak was observed for $NF_2$ groups on secondary carbons. The proton spectrum showed a triplet split by 29.0 cycles and olefinic hydrogens were observed. Thus, there is one $NF_2$ group attached to a primary carbon which contains hydrogen and there is an olefinic bond between 2 carbon atoms which do not contain $NF_2$ groups.

It is not intended to restrict the present invention to the foregoing embodiment, but rather it should only be limited by the appended claim.

What is claimed is:
Allyl difluoroamine.

No references cited.

CHARLES B. PARKER, *Primary Examiner.*

LEON D. ROSDOL, *Examiner.*

B. R. PADGETT, *Assistant Examiner.*